Nov. 2, 1965    S. R. SWANSON    3,214,969
APPARATUS FOR FATIGUE TESTING UNDER RANDOM LOADS
Filed June 24, 1963    2 Sheets-Sheet 1

*Inventor*
SWAN ROY SWANSON
by: *Cavanagh & Norman*

Nov. 2, 1965  S. R. SWANSON  3,214,969
APPARATUS FOR FATIGUE TESTING UNDER RANDOM LOADS
Filed June 24, 1963  2 Sheets-Sheet 2
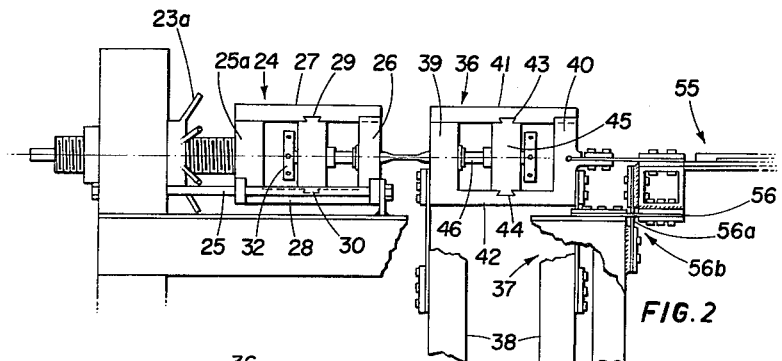
FIG.2
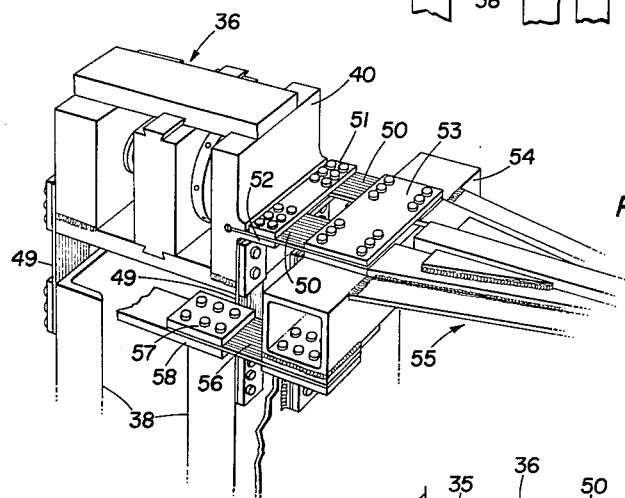
FIG.6
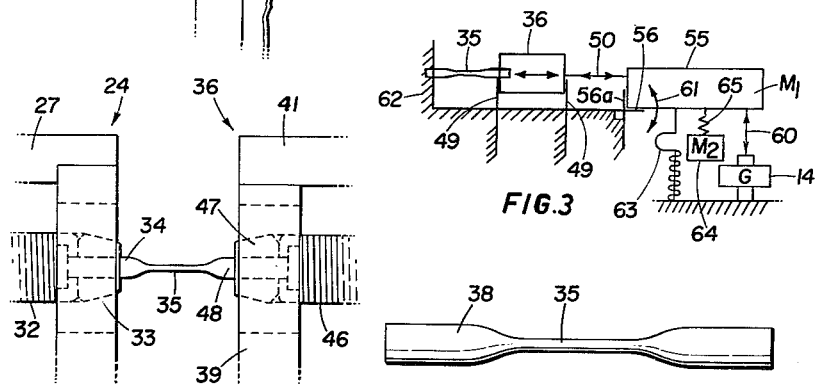
FIG.3
FIG.5
FIG.4
Inventor
SWAN ROY SWANSON
by: Cavanagh & Norman.

United States Patent Office 3,214,969
Patented Nov. 2, 1965

3,214,969
APPARATUS FOR FATIGUE TESTING
UNDER RANDOM LOADS
Swan Roy Swanson, Downsview, Ontario, Canada, assignor to The De Havilland Aircraft of Canada, Limited
Filed June 24, 1963, Ser. No. 290,072
5 Claims. (Cl. 73—91)

This invention relates to a method and apparatus for fatigue testing under random loads.

Effective simulation of random fatigue loading, where the cycles of the alternating load component are random rather than constant in amplitude, has long been a problem for test engineers. Generally the traditional well-known constant amplitude fatigue machine is employed in an attempt to arrive at the lifetime of a structure under random load. However, actual service conditions frequently involve loads of a random nature varying both in amplitude and frequency. Therefore, the utilization of prior test apparatus such as by the application of a constant amplitude test or a program series of tests at different amplitudes or different frequencies is not truly representative of a random environment.

In prior test methods it is known that the fatigue testing of samples may fail in a seemingly random way especially at relatively low loadings and, as a result, are interpreted according to the statistical method of the normal law of probability. From such information the endurance of the material may be reasonably assessed once the statistical distribution of the variants or scatter of the fatigue test results is established by a sufficient number of tests and a probability analysis of same.

This invention is directed toward effectively eliminating the necessity for extensive statistical analysis of fatigue test results by applying a random loading rather than a random analysis and in so doing to provide a suspension for the test specimen and the means for applying the load thereto which will minimize the introduction of unwanted effects into the loading characteristics.

It is another object of the invention to provide apparatus for fatigue testing under random loads for which the random load to be applied is communicated through suspension means transmitting said load to the specimen under test in a manner minimizing indirect loading effects.

It is a further object of the invention to provide fatigue testing apparatus employing a random noise generator adapted to develop an electrical signal energizing a random load applying device communicating to a specimen through a direct loading mechanism.

Other objects of the invention will be appreciated by a study of the following specification taken in conjunction with the accompanying drawings.

In the drawings:

FIGURE 2 is a partial elevation of the specimen clamping and load communicating mechanism on the apparatus of FIGURE 1.

FIGURE 3 is a diagrammatic illustration of the load applying mechanism of FIGURES 1 and 2.

FIGURE 4 is an elevation of a typical specimen or sample to which a fatigue loading is to be applied according to the invention, this sample being conventional for such test purposes.

FIGURE 5 is an enlarged detail of the gripping jaws of the apparatus of FIGURES 1 and 2 by means of which the specimen of FIGURES 3 and 4 is clamped as shown therein.

FIGURE 6 is a fragmentary enlarged perspective detail of the suspension for the random load applying means of the apparatus of FIGURES 1 and 2.

Figure 1:
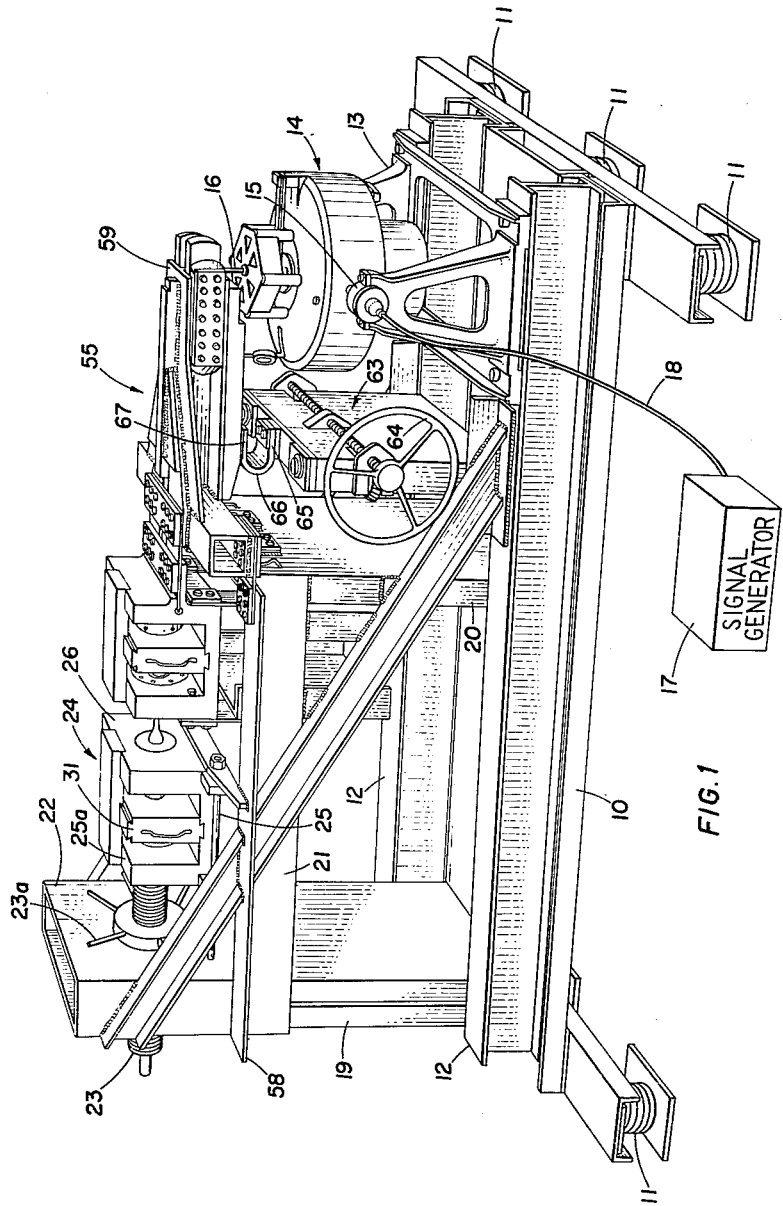
FIGURE 1 is a perspective view of a preferred form of apparatus according to the invention and showing a specimen extending between a stationary clamp or jaw mechanism and an effectively floating jaw and suspension mechanism therefore communicated mechanically to a random load generating device.

Referring to the drawings, in particular FIGURE 1, the apparatus of the invention generally comprises a base frame 10 supported on vibration absorbing legs 11 in carrying the rigid parallel spaced-apart frame member 12, supporting at one end the rigid shaker frame 13, pivotally supporting the electromagnetic shaker device 14 by the hub shafts 15 thereof. The electromagnetic shaker device 14 is of conventional construction having an axially moveable armature 16, moveable under the impulse of an electromagnetic field generated therein responsive to an electrical signal from signal generator 17 communicated thereto by signal cable 18. Armature 16 may, therefore, provide vertical mechanical components of random characteristics responsive to a random voltage from the signal generator 17, said signal generator being preferably of a kind embodying a conventional noise generator adapted to generate a substantially Gaussian signal.

A machine frame structure rises rigidly by relatively heavy support members 19 and 20 extending upwardly from between the frame members 12 to support the parallelly spaced-apart upper frame member 21. A head stock structure 22 embodies the manually adjustable positioning screw 23 adjustable by the hand wheel 23a to locate the stationary jaw structure 24 adjustable in its position longitudinally on the supporting guide rods 25. Referring also to FIGURES 2 and 4 to 6 the adjustable stationary clamp structure 24 embodies the rigid end pieces 25a and 26 fixed in spaced-apart relation by the members 27 and 28, the latter embodying transverse slots 29 and 30 respectively adapted to slideably receive compression block 31 keyed for lateral slideable relation therein and carrying a compression screw 32 adapted to be moved toward and away from end piece 26 to engage a deformable chuck device to 33 as shown in FIGURE 5, thereby rigidly to clamp one end 34 of a test sample 35 therein. Chuck device 33 comprises a conventional frustroconical member made of a resilient material and having within its bore a plurality of metal or other suitable gripping members adapted upon compression of the member into a conical socket to converge inwardly to clamp a test piece inserted in said bore.

A moveable clamp structure 36 is supported for free axial motion on a floating suspension or freely laterally deflectable support structure 37 rising from the frame members 21 by supports 38. Thus clamp structure 36, somewhat similar to clamp structure 24, embodies the rigid end pieces of 39 and 40 supported in rigid paralleled spaced-apart relationship by members 41 and 42 having lateral keyways or slots 43 and 44 accommodating the mating slides of the transversely insertable compression block 45 carrying a compression screw 46 adapted to engage with the frustroconical deformable chuck device 47 for clamping of the other end 48 of the test sample 35 as is revealed in FIGURE 5.

As will be evident from FIGURE 6, moveable clamp structure 36 has connected thereto the vertical flexible spring steel plates or bars 49 which extend outwardly to the members 38. Accordingly structure 36 may be moved or vibrated in the direction of the axis of the test specimen. The test load is applied to structure 36 through the axially aligned spring steel load strips or bars 50 extending axially from clamps 51 on flange 52 of end piece 40 and extending to clamped connection as at 53 fastening the other end of said rigid but flexurable strips to crossbar 54 forming a part of loading lever structure 55.

The loading lever structure 55 is supported by and mounted on the flexible spring steel hinge strips or bars 56 extending freely from crossbar 54 to fastening clamps 57 anchored to flanges 58 of frame members 21. (See also FIGURE 1.) Also, the lever structure 55 effectively projects outwardly from the vertical supporting flexible hinge strips or bars 56a to provide a lever arm pivot structure 56b.

As will be evident from the simplified diagrammatic illustration of FIGURE 3, motion generator 14 by its armature effects vertical motion in the direction of arrow 60 which is translated by lever 55 by virtue of its pivoting about hinge 56 to arcuate motion as represented by arrow 61 which is translated by the tangential load applying bars 50 to axial motion effecting axial motion in turn of moveable clamp structure 36 supported in effectively floating suspension for such axial motion by the flexurable mounting strips 49. The stationary end of the test sample 36 is represented as being clamped on a rigid bed 62 extending to include the stationary ends of strips 49 and resilient hinge 56 as representative of the function of the frame structure heretofore described.

Pre-loading of the test sample in the axial direction may be accomplished by tensioning or compressioning the load spring device 63 shown in more detail in FIGURE 1 and comprising a hand wheel 64 adapted to raise and lower the lower arm 65 of the heavy U-shaped spring 66 attached by its upper arm 67 to the lever arm structure 59 and motion translating lever 55. In this way the test specimen may be pre-loaded as desired while the fatigue testing load applied from the load generating device 14 is superimposed thereon.

In the apparatus thus far described a single-degree-of-freedom system is provided.

The random fatigue system of the apparatus described utilizes the load generator 14 to provide either a random or a functional load input translated to apply, of course, to the specimen under the pre-load determined by the pre-loading spring structure 63 applied through the moveable clamping structure to one end of test specimen. The specimen or test sample is connected at its other end to the frame or foundation of the machine. The stiffness of the specimen, of the loading spring device 63 and the inertia of the lever and moving clamp head, combine to establish the fundamental resonant frequency of a single-degree-of-freedom system, the frequency being adjustable by changing the inertia of lever 55 by moving the mass $M_1$ in either direction along the lever. The loading spring 63 and its stiffness may also be varied to give a range of resonant frequencies. Of course, the fundamental frequency may also be altered by using specimens of different stiffnesses.

A two-degree-of-freedom system is contemplated according to this invention in order to take into account the flexibility of structures simulated by the test specimen. This may be simulated by applying, by any suitable means, the equivalent of a second mass $M_2$ suspended by a spring 68 from lever structure 55. The point along the lever structure 55 from which it is suspended as well as the characteristics of the spring device 68 and the weight of $M_2$ will produce a two-degree-of-freedom system which, by varying the inertia of the mass $M_2$ and the stiffness of spring 68, it is possible to vary the two natural frequencies of the system and also the ratio of the admittances at these two frequencies. For a typical test spicemen, the lower natural frequency is 10–40 c.p.s. and the upper natural frequency is 40–150 c.p.s. Fortunately the fatigue process appears to be insensitive to operating frequency over a reasonable range, thereby permitting a test rate twenty times faster than the 1 c.p.s. and 3 c.p.s. fundamental vibrational frequencies common in aircraft wing structures would dictate, therefore, a large number of specimens may be tested in a relatively short period of time.

For conventional constant amplitude testing, and for investigations of the frequency response of the machine, a conventional oscillator may provide a sinusoidal signal.

In random fatigue testing for which the system is primarily intended, the random signal is taken from a noise generator. The power output of the generator is essentially Gaussian with a flat power spectrum over a wide frequency range. A filtering system is preferably connected in the circuit and performs the double duty of both shaping the random signal to give a variety of different inputs to the power amplification system and also increasing the overall efficiency by limiting the bandwidth of the random signal. After amplification, the signal is fed to the driver coil of a conventional 600 pound shaker. An important advantage gained in this machine is that the same machine is used for both constant amplitude and random amplitude testing. In this way, tests to determine the effect of random loading are not obscured by apparatus characteristics.

Both the static and the dynamic loads to the specimen are measured by means of a strain gauge bridge mounted on the flexible transfer plate between the lever, and the "moving" gripping head. The strain signal is amplified and fed to an oscillograph, an electronic counter and a photo-electric monitoring unit. The oscillograph is used to measure the dynamic and static loads on the specimen. An electronic counter, which records the number of strain occurrences above a pre-set level is used to record the fatigue life of the specimen. The device is also useful for determining the distribution form of the random strain output. A photoelectric monitoring unit is used to cut off the main power supply when the R.M.S. strain changes by a prescribed amount, indicating that the specimen is about to break. The oscillations of the shaker can be measured by using a built-in velocity transducer. Finally, a timer may be connected in the circuit to measure the duration of a test.

The fatigue apparatus of the invention is intended primarily to simulate the effect of random loads on flexible structures. If a random signal is applied to a structure with a flat response, the output signal will be similar to the input signal. If, however, the structure has response characterized by one or more resonances, it will act as a filter, passing only those components of the signal having a frequency near these resonant frequencies.

For an accurate simulation of a flexible structure under random loading, there are two parameters to consider—the type of random loading and the nature of the response of the structure. It is not necessary, however, to apply the actual random signal to the actual structural response. Any random signal applied to any structural response is sufficient provided the correct output stress is produced in the structure.

In the case of the apparatus of the invention the correct stress output is produced by a combination of three parameters—a random noise generator with constant power output over a wide frequency range, a filtering system and a variable mechanical response system. By combining the random noise generator signal with a filtering system, a wide range of input signals may be produced. By applying these signals to the variable mechanical system, a wide variety of output responses is obtainable. An advantage of using a random noise generator as the random signal source is that its output is essentially Gaussian, a characteristic of a number of random signals found in practical cases.

As will be apparent from the foregoing the fatigue testing apparatus of the invention enables a standard fatigue test specimen or other specimen of predetermined selected form to be subjected to a random loading or, in fact, any predetermined loading of a fatigue type applied axially to the specimen. The loading may be random in amplitude and frequency or may have amplitude and frequency characteristics necessary to the nature of the inquiry to be undertaken. Generally, a rigid base frame embodies means for rigidly clamping one end of the specimen in fixed relation to the base. A moveable clamp structure clamps the other end of the specimen and is supported on a suspension provided by a plurality of flexurable parallel spaced-apart plate-like members each having one end rigidly fastened to the base and the other end of each being rigidly fastened to the moveable clamp structure whereby, due to the flexure of said members, the clamp structure is enabled effectively to float freely on the suspension for motion in alignment with the longitudinal axis of the specimen. A loading member of similar flexurable type projects from the clamp structure in a direction opposite to the specimen clamped thereby and is fastened to a lever which, in concept, may be regarded as of a bell crank class pivoted on the base, again, by further flexurable members defining a hinge called a flexure pivot therefor and having the other effective arm portion of the bell crank lever adapted to be subjected to a load at right angles thereto responsive to a predetermined electrical signal of selected amplitude and frequency or including a signal random as to amplitude, frequency or both as may be desired. The apparatus as described may also embody an independent inertial mass connected to the lever and defining therewith a two-degree-of-freedom loading system wherein the characteristics of the second-degree-of-freedom are controllable by the mass size and the magnitude and placement of the mass relative to the inertial mass characteristics of the lever and the adjustment of the connection between said inertial mass and said lever which embodies spring means as described adapted to be adjusted to control the relative tension therebetween.

What I claim is:

1. Tension apparatus for fatigue testing a predetermined specimen under selectable loading, and comprising in combination: a rigid base frame; means for rigidly clamping one end of said specimen relative to said base; a moveable clamp structure adapted to clamp the other end of said specimen; means supporting said moveable clamp structure on said base for motion thereof in the direction of the longitudinal axis of said specimen; a loading memeber extending from said moveable clamp structure in a direction opposite to the specimen clamped thereby and substantially in alignment with the axis of said specimen; a loading lever substantially parallel to said axis and connected to said loading member in substantial alignment therewith; means hinging one end of said lever to said frame at a point spaced from said axis between said lever and said moveable clamp structure; means for generating a predetermined electrical signal; means responding to said signal for mechanically applying a load to the other end of said lever at substantially right angles to said axis in a plane containing said axis and hinge, said load varying in amplitude and frequency with the respective amplitude and frequency of said signal; and adjustable spring means extending between said lever and said base for loading said lever and said specimen.

2. Tension apparatus as claimed in claim 1 in which the means supporting said moveable clamp structure comprise a plurality of flexurable parallel spaced-apart plate-like members each having one end rigidly fastened to said frame, the other end of each of said members being rigidly fastened to said moveable clamp structure, the axis of the latter and said specimen being thereby located substantially at right angles to said members and substantially tangent to the flexurable motion thereof.

3. Tension apparatus as claimed in claim 1 in which a plurality of effectively flat flexurable plate members serve as means for supporting the moveable clamp structure, the loading member extending between the moveable clamp structure of said hinging means and said lever.

4. Tension apparatus as claimed in claim 1 wherein said lever and said moveable clamp structure are hingeably and moveably supported respectively on said frame by flexurable plate-like members each connected at one end to said frame and at the other to either said clamp structure or said lever, and said load member is in the form of a flexurable plate-like member extending between said moveable lever and said moveable clamp structure substantially in axial alignment with a specimen clamped thereby and anchored at its ends to said moveable clamp structure and said base.

5. Tension apparatus as claimed in claim 1 and the combination therewith of an independent inertial mass connected to said lever and defining therewith a two-degree-of-freedom loading system.

References Cited by the Examiner
UNITED STATES PATENTS 2,657,574  11/53  Whitehead _____ 73—116
2,693,699  11/54  Federn _____ 73—92

RICHARD C. QUEISSER, *Primary Examiner.*

DAVID SCHONBERG, *Examiner.*